United States Patent
Schofield et al.

(10) Patent No.: US 8,323,006 B2
(45) Date of Patent: Dec. 4, 2012

(54) SCROLL PUMP WITH AN ELECTROMAGNETIC DRIVE MECHANISM

(75) Inventors: Nigel Paul Schofield, Horsham (GB); James Alexander Haylock, Eastbourne (GB)

(73) Assignee: Edwards Limited, Crawley, West Sussex (GB)

( * ) Notice: Subject to any disclaimer, the term of this patent is extended or adjusted under 35 U.S.C. 154(b) by 0 days.

(21) Appl. No.: 12/087,814

(22) PCT Filed: Nov. 21, 2006

(86) PCT No.: PCT/GB2006/050404
§ 371 (c)(1), (2), (4) Date: Nov. 20, 2008

(87) PCT Pub. No.: WO2007/080371
PCT Pub. Date: Jul. 19, 2007

(65) Prior Publication Data
US 2009/0180909 A1    Jul. 16, 2009

(30) Foreign Application Priority Data
Jan. 12, 2006 (GB) .................................. 0600588.8

(51) Int. Cl.
*F04B 35/04* (2006.01)
*F01C 1/02* (2006.01)
(52) U.S. Cl. ..................................... 417/410.5; 418/55.3
(58) Field of Classification Search ............... 417/410.5, 417/420, 410.1; 418/55.1, 55.2, 55.3, 55.5
See application file for complete search history.

(56) References Cited

U.S. PATENT DOCUMENTS

| | | | | |
|---|---|---|---|---|
| 3,829,255 A | * | 8/1974 | Bykov et al. | 417/559 |
| 4,424,010 A | * | 1/1984 | McCullough | 417/420 |
| 4,610,611 A | * | 9/1986 | Blain | 418/55.5 |
| 4,789,315 A | | 12/1988 | Guettinger | |
| 4,795,323 A | * | 1/1989 | Lessie | 418/55.3 |
| 4,950,135 A | * | 8/1990 | Tojo et al. | 417/410.5 |

(Continued)

FOREIGN PATENT DOCUMENTS

GB    2 233 043 A    1/1991

(Continued)

OTHER PUBLICATIONS

PCT Notification of Transmittal of the International Search Report and the Written Opinion of the International Searching Authority, or the Declaration of International Application No. PCT/GB2006/050404; Date of mailing: Mar. 5, 2007.

(Continued)

*Primary Examiner* — Charles Freay
*Assistant Examiner* — Alexander Comley

(57) ABSTRACT

Scroll-type pumping apparatus comprises a stator (104) comprising a fixed scroll member (106) having an end plate with a first spiral wrap (110) extending therefrom; an orbital scroll member (108) having an end plate with a second spiral wrap (112) extending therefrom to intermesh with the first spiral wrap; a plurality of flexible supports (118) each having one end connected to the orbital scroll member and another end connected to the stator to support the orbital scroll member relative to the stator, and a linear drive system (120) for driving the orbital scroll member to orbit relative to the fixed scroll member. The use of a linear drive system in combination with the flexible supports can provide apparatus having no rotational or rubbing parts.

5 Claims, 3 Drawing Sheets

U.S. PATENT DOCUMENTS

| | | | |
|---|---|---|---|
| 5,002,470 A * | 3/1991 | Gormley et al. | 417/410.5 |
| 5,073,093 A * | 12/1991 | Takagi et al. | 417/410.5 |
| 5,090,876 A * | 2/1992 | Hashizume et al. | 417/410.5 |
| 5,123,818 A * | 6/1992 | Gormley et al. | 417/410.5 |
| 5,366,358 A * | 11/1994 | Grenci et al. | 418/55.4 |
| 5,481,146 A * | 1/1996 | Davey | 310/90.5 |
| 5,791,883 A * | 8/1998 | Ban et al. | 417/410.5 |
| 5,987,894 A * | 11/1999 | Claudet | 62/6 |
| 6,022,202 A * | 2/2000 | Pottier et al. | 418/55.3 |
| 6,027,317 A * | 2/2000 | Barthod et al. | 417/410.5 |
| 6,154,013 A * | 11/2000 | Caamano | 322/89 |
| 6,199,391 B1 * | 3/2001 | Link et al. | 62/133 |
| 6,368,065 B1 * | 4/2002 | Hugenroth et al. | 417/53 |
| 6,568,520 B2 * | 5/2003 | Hattori et al. | 192/84.961 |
| 6,710,483 B2 * | 3/2004 | Ota et al. | 310/82 |
| 2002/0081220 A1 * | 6/2002 | Ota et al. | 417/410.5 |
| 2003/0213256 A1 * | 11/2003 | Ueda et al. | 62/230 |
| 2005/0272976 A1 * | 12/2005 | Tanaka et al. | 600/114 |
| 2006/0051225 A1 * | 3/2006 | Dovey et al. | 418/55.1 |
| 2006/0278069 A1 * | 12/2006 | Ryan | 86/50 |
| 2008/0124236 A1 * | 5/2008 | Schofield | 418/55.1 |
| 2009/0180909 A1 * | 7/2009 | Schofield et al. | 418/55.1 |

FOREIGN PATENT DOCUMENTS

| | | | |
|---|---|---|---|
| GB | 2006061559 | * | 11/2005 |
| JP | 3-164587 | | 7/1991 |
| JP | 3-237204 | | 10/1991 |
| JP | 2002-276568 | | 9/2002 |
| JP | 2004-183485 | | 7/2004 |
| WO | WO 2006/061559 A1 | | 6/2006 |

OTHER PUBLICATIONS

PCT International Search Report of International Application No. PCT/GB2006/050404; Date of mailing of the International Search Report: Mar. 5, 2007.

PCT Written Opinion of the International Searching Authority of International Application No. PCT/GB2006/050404; Date of mailing: Mar. 5, 2007.

United Kingdom Search Report of Application No. GB0600588.8; date of mailing: May 9, 2006; Claims searched: 1-11; Date of Search: May 8, 2006.

Ito Takahide, English language abstract of publication No. JP 03237204, "Scroll Type Fluid Machinery," Publication Date: Oct. 23, 1991; Application Date: Feb. 9, 1990; Application No. 02030985; Mitsubishi Heavy Ind Ltd.

Sawada Hirotaka, English language abstract of publication No. JP 2004183485, "Scroll Compressor," Publication Date: Jul. 2, 2004 Application Date: Nov. 29, 2002; Application No. 2002347725; Fujitsu General Ltd.

Shikada Zenichi, Kitano Hitoshi; English language abstract of publication No. JP2002276568, "Scroll Type Pump," Matsushita Electric Works Ltd; Sep. 25, 2002.

Kuroshima Ryoichi; English language abstract of publication No. JP3164587 A; "Scroll-Type Fluid Compressor,"Hitachi Ltd; Jul. 16, 1991.

* cited by examiner

SCROLL PUMP WITH AN ELECTROMAGNETIC DRIVE MECHANISM

FIELD OF THE INVENTION

The present invention relates to scroll-type apparatus and, more particularly, to scroll-type apparatus for use in vacuum pumps.

BACKGROUND OF THE INVENTION

Scroll-type apparatus is known for operating compressors or vacuum pumps. In both cases the apparatus comprises two scroll members each comprising a flat end plate on which are upstanding strips defining a spiral (or scroll) type structure which interact by placing the scroll members together with the respective spiral type structures inter-engaging and allowing one scroll member to "orbit" relative to the other. In this way it is possible to trap a volume of gas between the scroll members thereby to urge the gas from one end of the respective spirals to the other. In a vacuum pump in particular the gas enters via a pump inlet at the periphery of the scroll members and exits via a pump outlet at the centre of the scroll members.

FIG. 1 illustrates one known arrangement of such scroll-type apparatus in the form of a vacuum pump 2, which includes a stator 4 comprising a fixed scroll member 6. Complimenting the fixed scroll member 6 and intermeshing therewith in a manner known per se is an orbital scroll member 8. The orbital member 8 is mounted on bearings 10, which are supported on a crank end 12 of a drive shaft 14 extending from a motor 16. Bearings 17 serve to support the drive shaft 14 relative to the housing 4. Each scroll member 6, 8 includes an end plate to which is attached and from which extends outwardly therefrom a spiral wrap 18, 20. The height of each wrap 18, 20 is substantially the same as the distance between the opposed end plates so that the free edge of each wrap 18, 20 forms a seal against the face of the complimentary scroll member end plate. To assist in the sealing process, complaint tip seals (not shown) are commonly provided at the free edge of each wrap 18, 20 to take up the axial clearance between the edge of each wrap 18, 20 and the end plate of the opposing scroll member.

In use, a pumped gas is drawn into the pump 2 from inlet 22 and exits via outlet 24 and non-return valve 25. In order to seal the vacuum space in the housing 4 from ambient atmosphere and the pump drive system, a metal bellows 26 is disposed substantially co-axially with the drive shaft 14. The metal bellows is attached at one end by bolts 28 to the orbital scroll member 8 and at its opposite end to a stationary part 30 of the pump by bolts 32. O-rings 29, 31 serve to seal the attachment of the metal bellows 26.

By virtue of the torsional stiffness of the metal bellows 26, the bellows 26 also serves to limit undesirable travel in the circular translation of the orbital scroll member 26 and thus maintain the correct angular position between the fixed scroll member 6 and the orbital scroll member 8. However, the use of such bellows restricts the design of any vacuum pump incorporating such bellows to the dimensions of adequately sized bellows having the required torsional stiffness and sufficient radial freedom for required crank throw to achieve in practice an acceptable life.

Furthermore, the use of compliant tip seals to provide axial sealing between the scroll members 6, 8 can generate the dust due to erosion of tip seals during use of the pump. Whilst this dust is generally conveyed through the outlet 24 together with the exhaust gas, when the pump is switched off this dust could migrate through the inlet 22 towards the evacuated apparatus, leading to unwanted contamination of the evacuated apparatus. The tip seals therefore require regular replacement, and their use further restricts the design of any vacuum pump incorporating such seals to the dimensions of adequately sized tip seals.

It is an aim of at least the preferred embodiment of the present invention to solve these and other problems.

SUMMARY OF THE INVENTION

The present invention provides scroll-type pumping apparatus comprising a stator comprising a fixed scroll member having an end plate with a first spiral wrap extending therefrom; an orbital scroll member having an end plate with a second spiral wrap extending therefrom to intermesh with the first spiral wrap; a plurality of flexible supports each having one end connected to the orbital scroll member and another end connected to the stator to support the orbital scroll member relative to the stator; and a linear drive system for driving the orbital scroll member to orbit relative to the fixed scroll member.

BRIEF DESCRIPTION OF THE DRAWINGS

Preferred features of the present invention will now be described with reference to the accompanying drawings, in which.

DETAILED DESCRIPTION OF THE INVENTION

Figure 1:
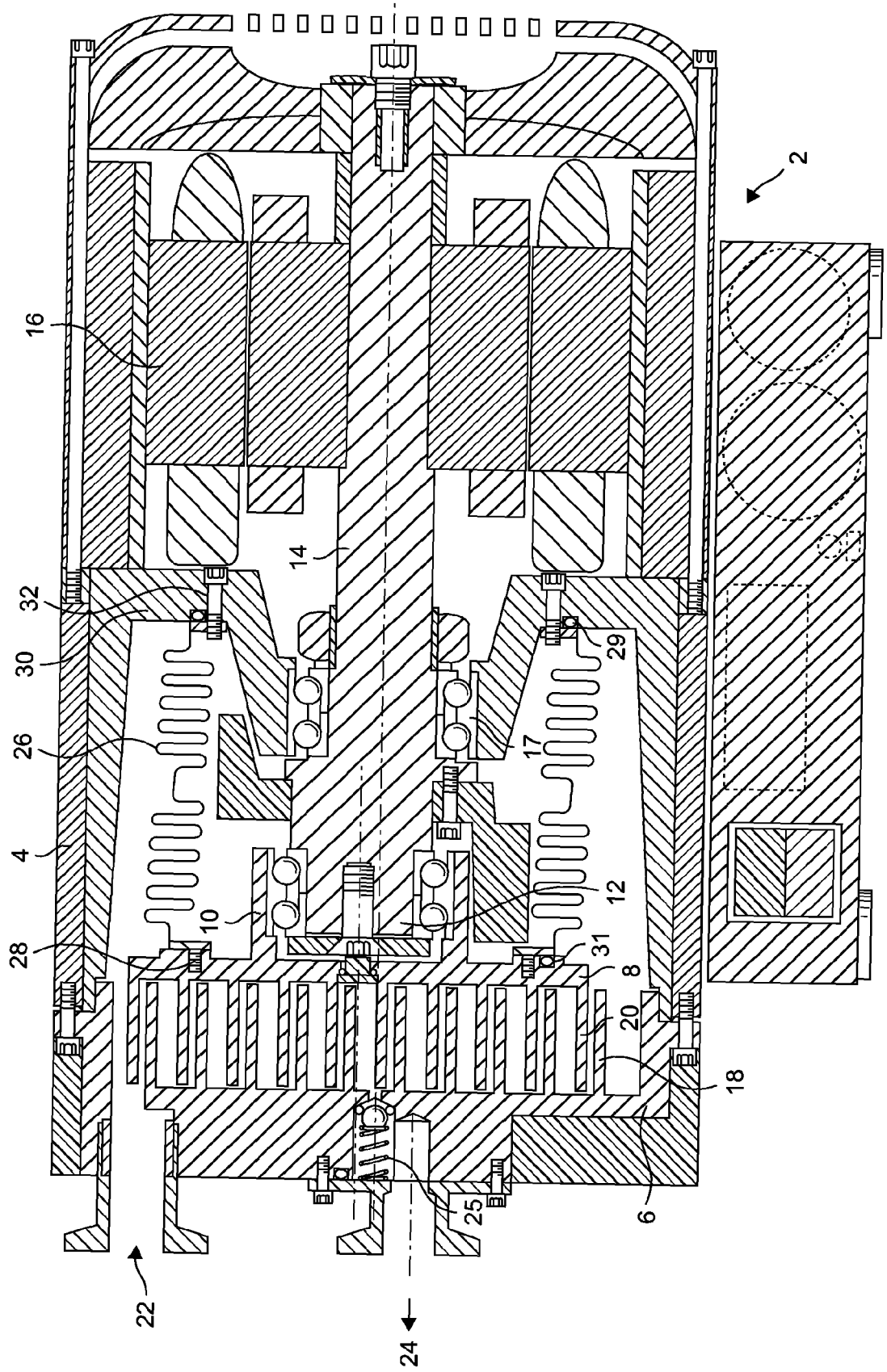
FIG. 1 is a cross-section through a known scroll-type vacuum pump.

The use of such flexible supports, preferably flexible rods, can provide support of the orbital scroll member relative to the stator with a high degree of axial accuracy, thus enabling very close running clearances between the edge of each spiral wrap and the end plate of the opposite scroll member without the need for tip seals, and so the generation of dust associated with the use of tip seals is avoided. The use of the flexible supports in combination a linear drive system for causing the orbital scroll member to orbit relative to the fixed scroll member can enable apparatus to be provided which has no rotational or rubbing parts, such as bearings.

The linear drive system preferably comprises a drive member connected to the orbital scroll member, and means for applying a magnetic force to the drive member to cause the drive member to orbit relative to the fixed scroll member with substantially no rotation thereof. The flexible supports are preferably located about the drive member.

In one embodiment, the drive member comprises a magnet, or magnetic member, connected to the orbital scroll member, and wherein the means for applying a magnetic force comprises a plurality of coils located about the magnet or magnetic member. When current flows through the coils, a force is applied to the magnet or magnetic member which causes it to move. Position sensors and a control system may be provided for controlling the current flowing through the coils to ensure that the magnet or magnetic member performs an orbital movement relative to the fixed scroll member.

In another embodiment, the drive member comprises a plurality of coils located about a longitudinal axis, and wherein the means for applying a magnetic force comprises a plurality of magnets each located adjacent a respective coil. The drive member may comprise a disc upon which the coils are mounted, the disc being substantially parallel to the end plate of the orbital scroll member. When current flows through the coils, a magnetic force is applied to the drive member which causes the drive member to move. Again, position sensors and a control system may be provided for controlling the current flowing through the coils to ensure that the drive member performs an orbital movement relative to the fixed scroll member.

A mechanical resonance frequency is determined by the combined moving masses of the orbital scroll and the flexible supports. For maximum efficiency, the drive system is preferably configured to operate at a drive frequency substantially equal to the mechanical resonance frequency.

The flexible supports may also serve to inhibit any accidental rotation of the orbital scroll member relative to the fixed scroll member.

Whilst a bellows may be provided to separate a vacuum space from the ambient atmosphere, there is no requirement for the bellows to have a particular torsional stiffness. As a result, there is a greater freedom of design of a vacuum pump incorporating the apparatus of the present invention, enabling a relatively small, low cost pump to be provided which has good axial sealing between the scroll members.

An abradable coating may be provided on a surface of at least one of the scroll members. The coating may extend over the surface of the end plate and the spiral wrap of the, or each, scroll member.

The rods may be formed from a metallic or composite material. The scroll-type apparatus may be used as either a compressor or as an expander.

Figure 2:
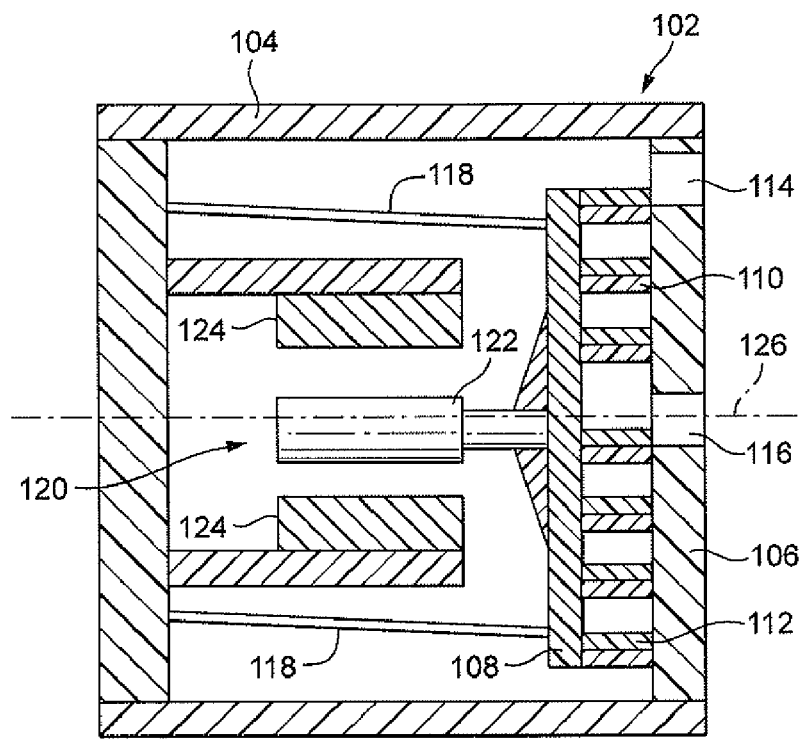
FIG. 2 is a simplified cross-section through a first embodiment of a scroll-type vacuum pump.

With reference to FIG. 2, a first embodiment of a scroll-type apparatus is in the form of a vacuum pump 102, which includes a stator 104 comprising a fixed scroll member 106. Complimenting the fixed scroll member 106 and intermeshing therewith in a manner known per se is an orbital scroll member 108. Each scroll member 106, 108 includes an end plate to which is attached and from which extends outwardly therefrom a spiral wrap 110, 112. The height of each wrap 110, 112 is substantially the same as the distance between the opposed end plates so that the free edge of each wrap 110, 112 forms a seal against the face of the complimentary scroll member end plate. An abradable coating may be provided on the end plate and wrap of at least one of the scroll members 106, 108. A gas inlet 114 and a gas outlet 116 are located in the end plate of the fixed scroll member 106.

The orbital scroll member 108 is supported axially relative to the fixed scroll member 106 by a plurality of flexible supports, in this embodiment provided by a plurality of flexible rods 118. One end of each rod 118 is secured to the stator 104 by any suitable means, for example, adhesive or bolts, and the other end of each rod is similarly secured to the end plate of the orbital scroll member 108. At least three rods 118 are generally required, although any number may be provided. The rods 118 may be formed from any suitable material having a stiffness that allows the rods 118 to flex to allow the orbital scroll member 108 to orbit relative to the fixed scroll member 106. For example, the rods 118 may be formed from metallic material, such as steel, or a composite material, such as an organic matrix composite material comprising a resin filled with reinforcing particles and/or fibres. This material is preferably a thermosetting resin, such as epoxy, filled with reinforcing carbon fibres.

The end plate of the orbital scroll member 108 is connected to a linear drive system 120 for driving the orbital scroll member 108 to orbit relative to the fixed scroll member 106. In this embodiment, the linear drive system 120 is provided by a moving magnet, linear actuator system, in which a magnet 122 is attached to the end plate of the orbital scroll member 108 and extending substantially perpendicularly therefrom. The magnet 122 is surrounded by a plurality (two or more) of fixed coils 124, to which a variable current is supplied by any suitable device (not shown) to cause the magnet 122 to move in a circular or orbital motion about longitudinal axis 126, and therefore relative to the fixed scroll member 106, with substantially no rotation thereof. Relative orbital movement between the fixed scroll member 106 and the orbital scroll member 108 causes gas to enter the pump 102 through the gas inlet 114, and to be compressed as it passes between the wraps 110,112 of the scroll members 106,108 towards the gas outlet 116.

Position sensors and a control system (not shown) may be provided for controlling the current flowing through the coils 124 to ensure that the magnet 122 performs an orbital movement about the longitudinal axis 126 relative to the fixed scroll member. In this embodiment, the rods 118 also serve to inhibit any accidental rotation of the orbital scroll member 108 relative to the fixed scroll member 106.

In the embodiment shown in FIG. 2, the end plate of the fixed scroll member 106 is integral with the stator 104. Alternatively, the end plate of the fixed scroll member 106 may be provided in the form of a plate mounted on the stator by any convenient method. For example, in the second embodiment shown in FIG. 3, the fixed scroll member 106 is mounted on, or integral with, an enclosure 128 for the drive system 120 and upon which the coils 124 are mounted, the magnet 122 passing through an aperture provided in the fixed scroll member 106.

In either of the first or second embodiments described above, the magnet 122 may be replaced by a member formed from magnetic material, for example iron.

Figure 3:
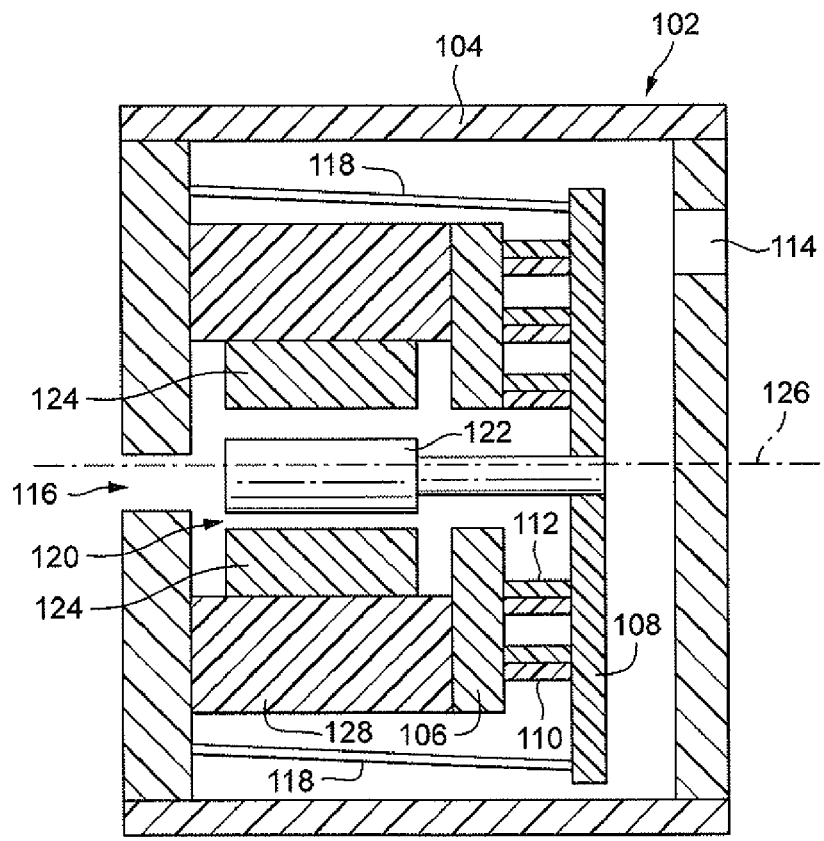
FIG. 3 is a simplified cross-section through a second embodiment of a scroll-type vacuum pump.
Figure 4:
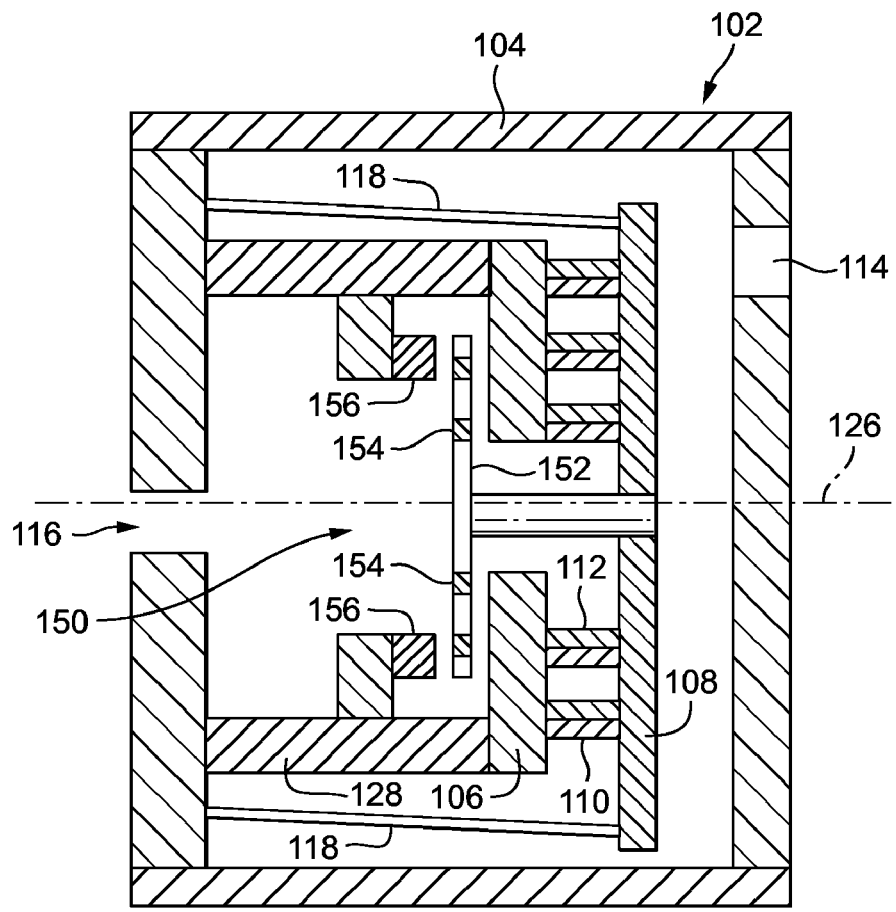
FIG. 4 is a simplified cross-section through a third embodiment of a scroll-type vacuum pump.
Figure 5:
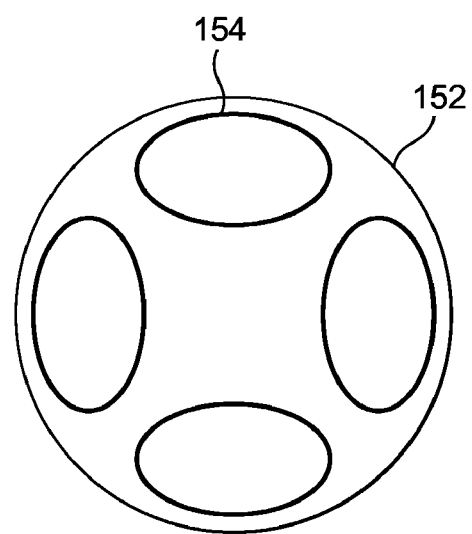
FIG. 5 is an end view of the moving coils of the linear drive system of the pump of FIG. 4.

In the third embodiment shown in FIG. 4, the drive system 120 of FIG. 3 is replaced by a linear drive system 150 in the form of a moving coil linear actuator system. In this system, a disc 152 is attached to the end plate of the orbital scroll member 108 such that the disc 152 is substantially parallel to the end plate of the orbital scroll member 108. With reference also to FIG. 5, the disc 152 has a plurality of coils 154 located thereon; in this embodiment four coils 154 are located on the disc 152. A plurality of stationary magnets 156 are mounted on the enclosure 128 for the drive system 150 such that each magnet 156 is located opposite part of a respective coil 154, so that application of a variable current to each of the coils 154 by any suitable device (not shown) causes the disc 152 to move in a circular or orbital motion about longitudinal axis 126, and therefore relative to the fixed scroll member 106, with substantially no rotation thereof. As previously mentioned, position sensors and a control system (not shown) may be provided for controlling the current flowing through the coils 154 to ensure that the disc 152 performs an orbital movement relative to the fixed scroll member 106. Again, the rods 118 serve to inhibit any accidental rotation of the orbital scroll member 108 relative to the fixed scroll member 106.

In any of the above embodiments, the stiffness of the rods 118 is preferably such that a mechanical resonance frequency determined by the combined moving masses of the orbital scroll member 108 and the flexible rods 118 is substantially equal to the drive frequency of the drive system 120. Through resonance of the orbital scroll member 108, the efficiency of the pump 102 may be enhanced.

While the foregoing description and drawings represent the preferred embodiments of the present invention, it will be apparent to those skilled in the art that various changes and modifications may be made therein without departing from the true spirit and scope of the present invention.

We claim:

1. Scroll-type pumping apparatus comprising a stator comprising a fixed scroll member having an end plate with a first spiral wrap extending therefrom; an orbital scroll member having an end plate with a second spiral wrap extending therefrom to intermesh with the first spiral wrap; a plurality of flexible rods each having one end fixed to the orbital scroll member and another end fixed to the stator to support the orbital scroll member relative to the stator; and a linear drive system for driving the orbital scroll member to orbit relative to the fixed scroll member, without a bearing physically supporting a shaft that drives the orbital scroll member, wherein the linear drive system comprises a drive member having a magnet rotor being connected to the orbital scroll member, and surrounded in a radial direction by a plurality of coils for applying a magnetic force to the drive member to cause the orbital scroll member to orbit relative to the fixed scroll member with substantially no rotation thereof.

2. Apparatus according to claim 1 wherein the flexible rods are located about the drive member.

3. Apparatus according to claim 1 wherein a mechanical resonance frequency is determined by the combined moving masses of the orbital scroll and the flexible rods, and wherein the linear drive system is configured to operate at a drive frequency substantially equal to the mechanical resonance frequency.

4. Apparatus according to claim 1 wherein the flexible rods are formed from a metallic material.

5. Apparatus according to claim 1 wherein the flexible rods are formed from composite material.

* * * * *